Sept. 22, 1942. T. GREEN 2,296,611
ARTICLE HANDLING APPARATUS
Filed July 18, 1941 2 Sheets-Sheet 1
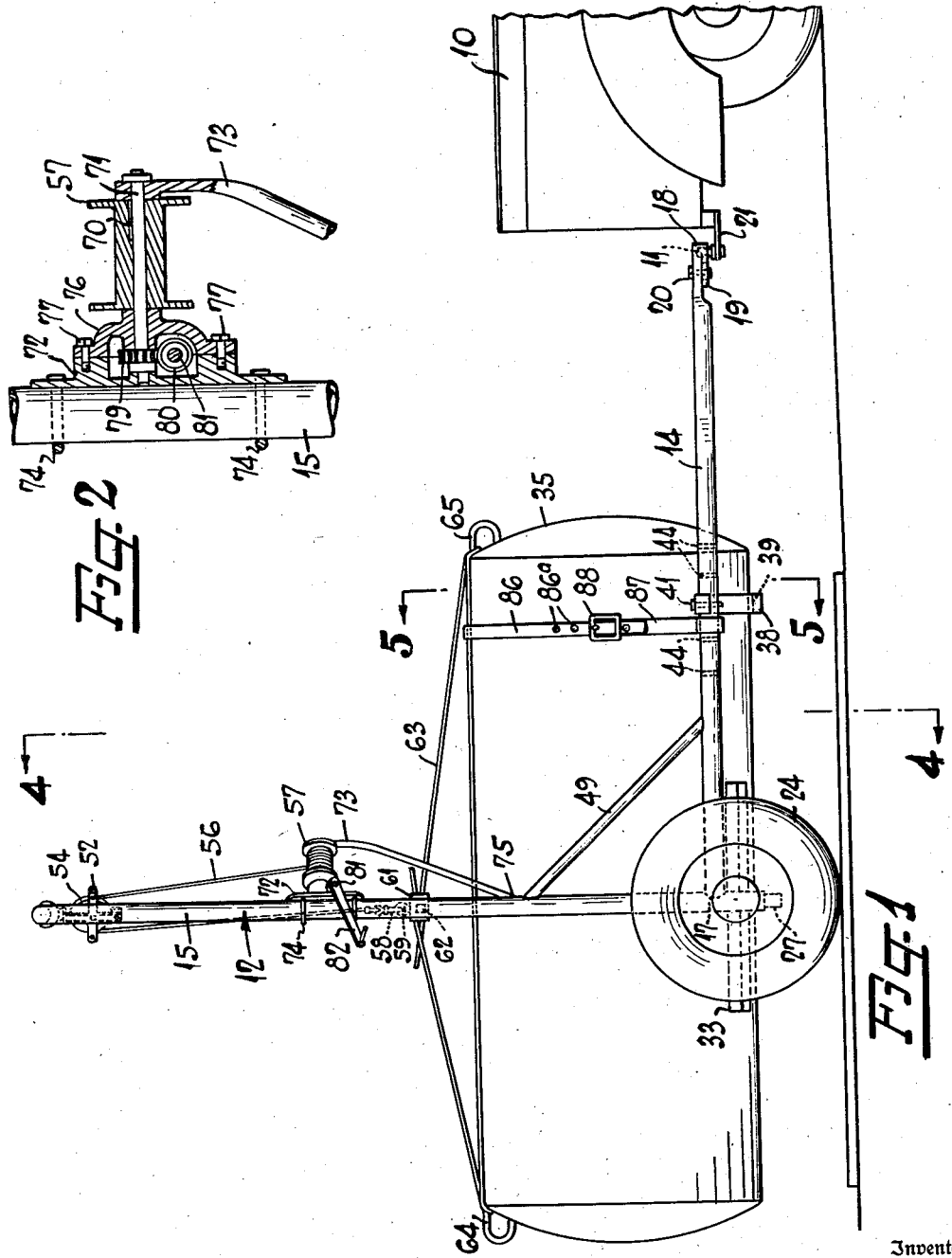
Inventor:
TAYLOR GREEN
By
Eaton + Brown
Attorneys Sept. 22, 1942.　　　　T. GREEN　　　　2,296,611
ARTICLE HANDLING APPARATUS
Filed July 18, 1941　　　　2 Sheets-Sheet 2
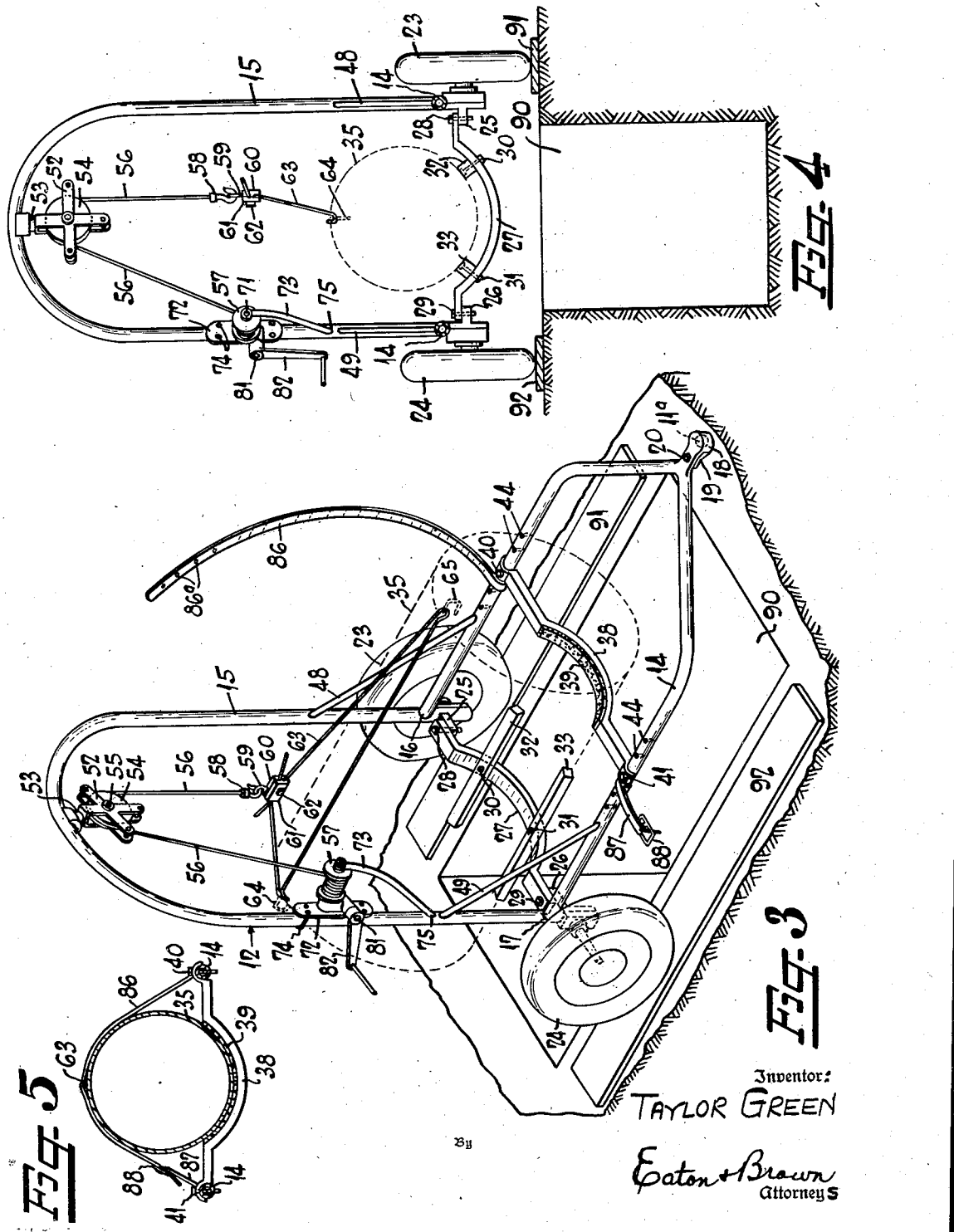
Inventor:
TAYLOR GREEN
By
Eaton & Brown
Attorneys Patented Sept. 22, 1942

2,296,611

UNITED STATES PATENT OFFICE 2,296,611

ARTICLE HANDLING APPARATUS

Taylor Green, Sarasota, Fla.

Application July 18, 1941, Serial No. 403,006

1 Claim. (Cl. 214—75)

This invention relates to transportation equipment and more especially to a trailer for carrying tanks and the like from place to place. The present invention is particularly concerned with the transportation of metallic underground tanks to the installation points and also with the handling of the tanks while installing the same.

Since most of the above-mentioned tanks are installed beneath the surface of the earth, it is very essential that the exterior surfaces be given a protective coat of rust-resisting paint. The tanks are usually painted in a shop and allowed to dry before transporting same to the point of installation. Heretofore, much difficulty has been experienced in obtaining suitable equipment capable of loading, transporting and unloading these tanks without damaging the painted surface. If the tank is not properly handled, the paint will be removed from certain portions thereof and thereby subject the metallic surface to the surrounding earth, resulting in oxidation and the forming of a hole in the tank. There has also been much difficulty in properly lowering the tank into the ground, during installation. Due to the weight of tanks of this nature it is very essential that the tank be under control at all times, to prevent damage.

It is therefore an object of this invention to provide a trailer having a hoist for lifting a tank to carrying position between the trailer wheels and also having removable means for supporting the tank while it is being carried. After excavating a hole at the place of installation, the trailer can be rolled astride the hole, the supporting means removed and the tank lowered by the hoist into the hole with little effort and no danger of the workman injuring himself or damaging the tank.

It is another object of this invention to provide a trailer of the class described in combination with a pick-up truck, which will permit one to haul tanks on the trailer, thereby leaving space in the truck for other articles.

Some of the objects of the invention having been stated, other objects will appear as the description proceeds when taken in connection with the accompanying drawings, in which—

Figure 1 is a side elevation showing a portion of a truck, with my improved trailer secured to the trailing end thereof;

Figure 2 is a sectional view showing the details of the hoisting mechanism used in association with the trailer;

Figure 3 is an isometric view showing the trailer in position over a hole into which a tank is adapted to be lowered;

Figure 4 is a transverse vertical sectional view taken along the line 4—4 in Figure 1;

Figure 5 is a transverse vertical sectional view taken along the line 5—5 in Figure 1.

Referring more particularly to the drawings, the numeral 10 denotes a suitable tractor or truck to which is pivotally secured as at ball 11, a suitable trailer mechanism embodying my improved invention and which is broadly designated by the reference character 12. The trailer comprises a horizontally disposed U-shaped member 14 having the ends thereof secured to the ends of a vertically disposed inverted U-shaped member 15, as at 16 and 17. The U-shaped member 14 has a suitable projection 18 integral with the front end thereof, said projection having associated therewith a removable plate 19 and a bolt 20 for holding the plate in position to confine the ball 11 within socket 11a. The ball 11 is attached to a bracket 21 on the truck 10.

It will be noted that the U-shaped member 15 is disposed substantially in a vertical position, whereas the U-shaped member 14 is disposed in a substantially horizontal position. If desired suitable diagonal braces 48 and 49 may be employed to connect the intermediate portion of U-shaped members 14 and 15 and to thereby add rigidity to the trailer framework. Rotatably secured near the lower ends of the inverted U-shaped member 15 are suitable wheels 23 and 24.

Tank supporting structure

Also secured to the lower ends of the U-shaped member 15 are suitable inturned projections 25 and 26, said projections being adapted to support the ends of an arcuate member or saddle 27. This arcuate member is removably held in position upon the projections 25 and 26 by any suitable means such as pins 28 and 29 respectively. Also secured to the upper concave surface of saddle 27 as at 30 and 31 are suitable longitudinally disposed stringer members 32 and 33, respectively. The stringer members 32 and 33 are preferably of wood and if of such material will ordinarily require no padded surface to contact the tank. The purpose of members 27, 32 and 33 is to removably support the lower portion of a suspended object such as a tank 35 when it has been raised to substantially the position shown in Figures 1, 3 and 4.

In order to provide an additional support for the tank 35, a second arcuate member 38 has been provided, said arcuate member having a suitable resilient or non-abrasive lining 39 secured to the upper side thereof, upon which the bottom of the tank 35 is adapted to rest. The ends of the member 38 rest upon the two legs of U-shaped member 14 and are secured thereto by means of suitable pins 40 and 41. If it is desired to vary the position of member 38 upon the legs of U-shaped member 14, it is only necessary to remove the pins 40 and 41 and then shift the support to the proper position so that the holes in the ends of arcuate member 38 will coincide with other holes 44 in the legs of the U-shaped member. Of course after the holes are made to coincide the pins 40 and 41 are again inserted. It is therefore seen that the members 27, 32, 33, 38 and 39 cooperate to hold the tank 35 after it has once been lifted beneath the U-shaped or arch member 15.

Hoisting structure

The upper portion of the inverted U-shaped member 15 has a suitable bracket 52 rotatably secured thereto as at 53, said bracket in turn having a sheave 54 rotatably mounted therein as at 55. A cable 56 passes over the sheave 54 and is wound around a suitable drum 57. This cable has a hook 58 on one end thereof penetrating an eye 59 in a plate 60, said plate being held in clamping relation with a second plate 61 by any suitable means such as bolt 62. Between the plates 60 and 61, the ends of a suitable fastening means such as a chain or cable 63 are adapted to be clamped. The cable 63 passes through suitable eyelets such as 64 and 65 on the ends of tank 35.

The drum 57 is fixedly secured as at 70 upon a suitable shaft 71, said shaft 71 having its ends rotatably mounted in brackets 72 and 73 (see Figure 2). The bracket 72 is secured to one leg of inverted U-shaped member 15 by any suitable means such as U-bolts 74 and the bracket 73 has its lower end secured to the same leg of the U-shaped member 15 as at 75, which point is disposed beneath the bracket 72 (Figure 3). The intermediate portion of shaft 71 is also rotatably mounted in a bracket 76, which bracket is secured to the bracket 75 by any suitable means such as stud bolts 77. Fixedly secured on one end of the shaft 71 and within a cavity 78 between the brackets 72 and 76 is a worm gear 79. This worm gear meshes with a worm 80 fixed on a shaft 81, said shaft having a handle 82 secured to the outer end thereof which is employed for winding and unwinding the cable 56 upon and from the drum 57.

After the drum 57 has been elevated to the position shown in Figures 1, 3 and 4, and after the supports 27 and 38 have been placed in position, the tension in the cable 56 is released to thereby allow the saddles 27 and 38 to support the entire weight of the tank. At this time a suitable strapping means is preferably employed for holding the tank in position while it is being transported from one location to another. This holding means may comprise a suitable strap 86, having one end thereof secured to one leg of the horizontal U-shaped member 14. Another strap 87 may be secured to the other leg of the U-shaped member 14, said strap 87 having a suitable buckle 88 thereon for receiving the loose end of the strap 86. Suitable holes 86a are punched in the loose end of the strap 86 for receiving the buckle tongue when the free ends of the two straps 86 and 87 are joined together. If desired, boards 91 and 92 may be placed on each side of the excavation 90 for supporting the wheels of the trailer.

Operation

The trailer 12 as described above is easily handled by one man and may be rolled over a tank 35 lying upon the ground with the removable saddles 27 and 38 taken out. The cable 56 and hook 58 are then attached to the tank 35, after which the tank is lifted by means of the hoisting mechanism previously described. When the tank is raised to the proper elevation the saddles 27 and 38 are inserted and then the tank is lowered upon the saddles. The straps 86 and 87 are united so that the tank may be held in fixed position while it is being transferred from one location to the other. When the tank is transferred to the point of installation, the trailer 12 is pulled or backed astride a suitable excavation or hole 90 and the straps 86 and 87 are disconnected, and then the hoist previously described is manipulated to raise the tank sufficiently to permit the saddles 27 and 38 to be removed. Then the hoist is employed for slowly lowering the tank 35 into the hole. When it has been properly positioned within the excavated hole, the cable and its associated parts are detached therefrom. By employing this method, the tank may be transferred from one location to another with the least amount of scratches and also may be loaded and installed with the minimum amount of effort.

In the drawings and specification there has been set forth a preferred embodiment of the invention, and although specific terms are employed, they are used in a generic and descriptive sense only, and not for purposes of limitation, the scope of the invention being set forth in the appended claim.

I claim:

A trailer for transporting a cylindrical object such as a tank, comprising a U-shaped horizontally disposed frame, a vertically disposed inverted U-shaped frame, the free ends of one frame being rigidly secured to the free ends of the other frame, stub axles secured to the lower ends of the vertically disposed frame for the reception of wheels, a hoist secured to one of the legs of the vertically disposed frame, a pulley secured below the top of the vertically disposed frame, a cable on said hoist and passing through the pulley, means on the free end of the cable for securing the cable to each end of the tank, the lower ends of the vertical frame having inwardly projecting portions, a flattened U-shaped bar having a quick releasable means on each end for securing the flattened U-shaped member to the projections to support the tank at approximately its center of gravity after it has been elevated by the hoist, a second flattened U-shaped member having its ends removably and adjustably secured to the two legs of the horizontal frame for supporting the front end of the tank, and adjustable flexible means secured to each leg of the horizontal frame for passing over the top of the tank for securing it against vertical and horizontal movement.

TAYLOR GREEN.